Aug. 13, 1963 LA VERNE WINKLE 3,100,880
TRANSISTORIZED PLATE MODULATOR SYSTEM
Filed Dec. 4, 1961
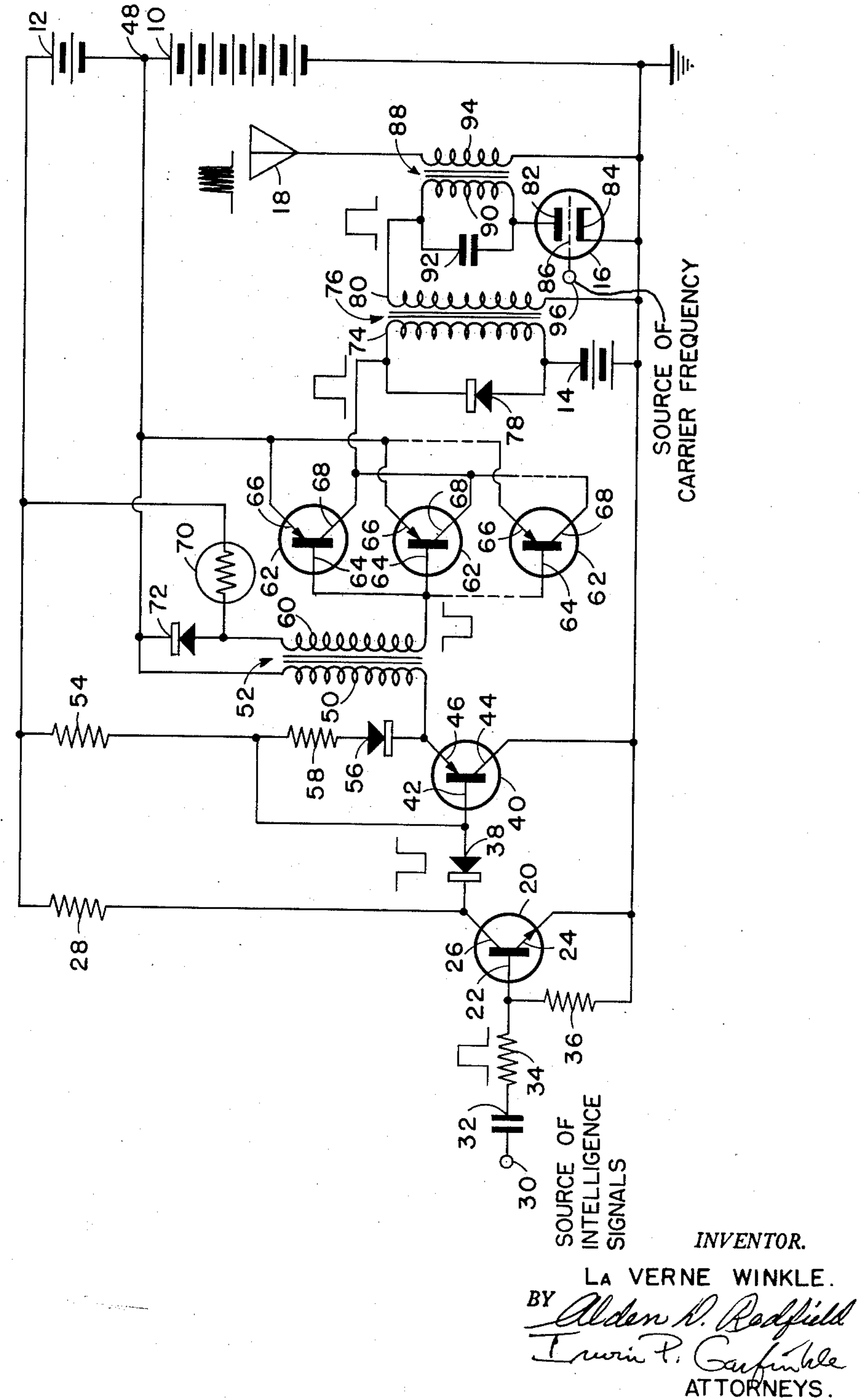
INVENTOR.
LA VERNE WINKLE.
BY Alden D. Redfield
Irwin P. Garfinkle
ATTORNEYS.

United States Patent Office
3,100,880
Patented Aug. 13, 1963

3,100,880

TRANSISTORIZED PLATE MODULATOR SYSTEM

La Verne Winkle, Cincinnati, Ohio, assignor to Avco Corporation, Cincinnati, Ohio, a corporation of Delaware Filed Dec. 4, 1961, Ser. No. 156,716
11 Claims. (Cl. 332—22)

This invention relates to a transistorized plate modulating system for supplying high power levels of energy for short intervals of time. More particularly, the present invention provides transistorized electronic circuitry useful in transforming low voltage battery power to drive a tube-type power amplifier for high peak power outputs. The system is used for modulating the plate of a transmitting vacuum tube for introducing intelligence into the transmission.

In many applications, battery-powered equipment is used for transmitting high power coded signals for short periods of time. In order to prolong battery life, and to achieve maximum economy of operation, it is essential that there be little or no power demand during the periods of no signal transmission. The modulator system of this invention performs the functions of a gated power supply and signal modulator in a high power battery driven transmitter.

An object of this invention is to provide a high peak power modulator system requiring essentially no current drain in a standby condition.

Another object of this invention is to provide a high peak power modulator system which includes the combination of a gated power supply and signal modulator.

Another object of this invention is to provide a transistorized high power driver and plate modulator suitable for pulse time modulation transmissions at peak powers in the order of kilowatts and pulse widths in the order of milliseconds.

Another object of this invention is the provision of a power gate or modulator for the introduction of coded command intelligence.

Still another object of this invention is the provision of a transistorized high power transmitter operable from a relatively low power storage source.

For other objects and for a better understanding of the nature of this invention, reference should be made to the accompanying drawing in which the single FIGURE represents a preferred embodiment.

This invention provides a unique modulator system for gating series-connected batteries 10, 12, and 14, or any other source suitable for the particular application, to a power vacuum tube 16, for developing a high power output to a transmitting antenna 18. The modulator system includes threshold set common-emitter, NPN-type transistor 20 having a base 22, an emitter 24, and a collector 26. The emitter 24 is connected directly to the grounded side of the battery 10, while the collector 26 is connected to the positive side of battery 12 through a resistor 28.

Signal input to the transistor 20 is applied across the base-emitter junction from terminal 30 through capacitor 32 and resistor 34, a resistor 36 being connected between the base 22 and ground. In the system as reduced to practice, the input signal to the transistor 20 comprised series of coded binary pulses, and operation of the system will be described in connection with pulses of that nature. However, the system is equally applicable for sine waves or other forms of signals.

The collector output from the transistor 20 is applied through a semiconductor diode 38 to the input of a PNP-type transistor 40 connected in an emitter-follower configuration. Transistor 40 has a base 42 connected directly to the output of the diode 38, and a collector 44 connected directly to ground. The emitter 46 is connected to the junction 48 between batteries 10 and 12 through the primary winding 50 of a transformer 52. Base bias is provided by means of a connection to the battery 12 through a resistor 54. For a purpose to be described, a connection is provided from the emitter 46 to the base 42 through a resistor 58 and a semiconductor diode 56.

The output from the secondary winding 60 of transformer 52 is applied to the input of a bank of parallel-connected transistors 62 for gating the required high power output to the tube 16. In the system as actually reduced to practice, ten transistors 62 were employed in the bank, but it will be understood that any number may be used dependent upon the power requirements for the particular application. The transistors 62 are provided with bases 64, emitters 66 and collectors 68 interconnected in parallel. In the absence of signal, a back bias is provided for the bases 64 by means of a connection through the secondary winding 60 to the junction of a sensitor-type thermistor 70 and a semiconductor diode 72 which are connected across the battery 12. The secondary winding 60 is connected across base-emitter junction of each transistor 62 in two paths, one through the sensitor-type thermistor 70 and the battery 12, and the other through the semiconductor diode 72. The output voltage developed at the collectors 68 is applied to the primary winding 74 of a transformer 76, which is connected to ground through the battery 14. A semiconductor diode 78 is connected across the primary winding to prevent kick-back voltages from injuring the transistors. The voltage developed across the secondary winding 80 is used to plate modulate the vacuum tube 16.

The vacuum tube 16 is a conventional triode having a plate 82, a cathode 84, and a control grid 86. It is to be understood, however, that tetrodes, pentodes, or other types of tubes or any other current-flow control device capable of handling the system power requirements may be used. The secondary winding is connected in series with the plate and cathode electrodes of the tube 16 through the primary winding 90 of an output transformer 88 having a secondary winding 94. The primary winding 90 is tuned to a carrier frequency by a capacitor 92, and the secondary winding 94 drives the transmitting antenna 18. A voltage at the carrier frequency is applied to the grid of the vacuum tube 86 at a terminal 96, and is modulated by the output voltage of the transformer 88 for transmission through the antenna 18.

In operation, positive pulses applied at terminal 30 to the base 22 of transistor 20 appear as negative pulses at the collector 26 and are applied to the base 42 of transistor 40 through the diode 38. The transistor 40 is back-biased beyond cut-off by the connection of the base-emitter junction across the battery 12 through the biasing resistor 54 and the primary winding 50 of transformer 52. When the magnitude of the pulses appearing at the collector 26 is sufficient to overcome the back bias, the transistor 40 is rendered conductive, and current-flow through the emitter-collector junction of transistor 40 results, thus developing an output across the transformer 52. The connection of the base 42 to the emitter 46 through the small resistor 58 and the diode 56 is provided for the purpose of reducing the degenerative coupling to the input circuit at the time power is developed across the transformer 52. That is to say, the base-emitter currents, which would otherwise flow through the primary winding 50 in a degenerative sense, are trapped in the loop including the base-emitter junction, the resistor 58, and the diode 56. Since degeneration is avoided, power gain is considerably improved.

The output from the secondary winding 60 of transformer 52 is then applied to the base 64 of each of the transistors 62. Initially, the base of each of the transistors is back-biased beyond cut-off by the connection to the junction of diode 72 and thermistor 70. The sensitor-type thermistor 70 is a resistive impedance element having characteristics such that its impedance increases with current or temperature. The diode 72 is slightly forward biased.

The introduction of a signal to the transformer 52 causes rectified current-flow in the base-emitter junctions of transistors 62, and this current-flow tends to reduce the back bias for two reasons. First, the rectified current flows through the sensitor-type thermistor 70 thus increasing its impedance, thereby tending to generate a voltage opposing the initial back bias; and, second, the rectified current flows through the diode 72 in a forward direction, thereby reducing its impedance. Since the sensitor-type thermistor 70 and diode 72 are, in effect, a potentiometer connected across the battery 12, the base 64 is moved closer to the emitter, and the back bias is almost entirely eliminated as current-flow increases. This action rapidly drives each of the transistors 62 into heavy conduction, thereby providing a steep build-up of power and peak collector-emitter current, and producing maximum output from the paralleled transistor power amplifiers.

The voltage output developed at the collector 68 is coupled through the transformer 76 to the plate 82 of the power amplifier tube 16. If the pulses applied to the plate 82 are of sufficient magnitude, the tube 16 is rendered conductive, and the carrier voltage applied at grid 86 is modulated by the applied pulse. Thus the carrier will be transmitted from the antenna 18 only when modulated by the input signal applied at terminal 30, and the tube 16 requires no power except during periods of power modulation.

In summary, the circuitry incorporated in this novel modulator system allows the triggered input stage including the transistor 20 and the emitter-follower stage including transistor 40 to stand by between pulses with essentially no power demand. The presence of a drive pulse at the base of transistor 40 causes very high current-flow in the emitter-collector circuit through the transformer 52, the secondary winding 60 of which is connected in circuit with the paralleled bases of the transistors 62, and also in circuit with the diode 72 and sensitor-type thermistor 70. The introduction of a signal at the bases 64 causes rectification at each of the base-emitter junctions, and this rectified current flows through the diode 72 to reduce its effective resistance while bucking the current-flow in the sensitor-type thermistor 70. This action rapidly drives the transistors 62 into heavy conduction, thereby providing a steep build-up of power and peak collector-emitter current output of the paralleled transistors 62 to modulate the plate of the vacuum tube 16.

Thus, the modulator system described can supply peak power for kilowatts of output from a relatively low power source while consuming little or no power on standby. Initially, the base emitter junctions of each of the transistors 62 and the transistor 40 are back-biased beyond cut-off by connections across the battery 12, and therefore no current whatsoever is consumed in these transistors until a signal sufficient to overcome the back bias is developed. Once such a signal is developed, the conduction through the transistor junctions is used to provide regeneration, or the reduction of degenerative currents, to provide maximum power gain in the shortest possible time. With this arrangement, the power tube 16 is not conductive until high power modulating signal is applied at its plate, thereby modulating the carrier for high power transmission.

In order to better enable persons skilled in the art to reproduce the preferred embodiment of this invention, the following parameters are listed:

| | |
|---|---|
| Transistors— | |
| 20 | Type 2N497. |
| 40 | Type 2N174A. |
| 62 | Type 2N174A. |
| Diodes— | |
| 38 | Type 1N484A. |
| 56 | Type DR305. |
| 72 | Type 1N248. |
| 78 | Type 1N245. |
| Sensitor-type thermistor 70 | Veco 11X1. |
| Capacitor 32 | 50 mfd. |
| Battery 10 | 34.5 volts. |
| Battery 12 | 1.5 volts. |
| Battery 14 | 6 volts. |
| Resistors— | |
| 28 | 1K ohms. |
| 34 | 360 ohms. |
| 36 | 1K ohms. |
| 54 | 150 ohms. |
| 58 | 120 ohms. |

As reduced to practice with the foregoing parameters, the system had operating characteristics as follows:

| | |
|---|---|
| Peak output power | 1.5 kw. (typical). |
| Pulse width | 7–10 milliseconds. |
| Duty cycle | 4%. |
| Transformer 52—primary current | 150 amps. |
| Output load impedance | 2700 ohms. |
| Voltage transformation ratio (load conditions) | 100/1. |
| Output voltage | 2900 volts. |

It is to be understood that the foregoing parameters are only illustrative, and this invention should not be limited in any way except as defined in the annexed claims as interpreted in the light of the prior art.

What is claimed is:

1. In a signal sensitive modulator system, the combination comprising:
   - a high power current-flow control device;
   - a direct current source of energy;
   - a source of intelligence signals;
   - means responsive to said intelligence signals for gating the energy from said direct current source through said device for periods when said signals exceed a predetermined level, said means including a plurality of parallel-connected transistors each having a base electrode, an emitter electrode, and a collector electrode, said collector electrodes being reversed biased and said emitter electrodes being forward biased from said direct current source;
   - a source of base-biasing potential for back-biasing said transistors beyond cut-off, said source of base-biasing potential including a second direct current source, first and second impedances connected across said source, each of said bases being connected to the junction of said impedances, at least one of said impedances having impedance characteristics which vary with applied currents;
   - means coupling said intelligence signals to said bases, whereby said back bias on said bases is opposed and current flows through said emitter and collector junction when said back bias is overcome;
   - means responsive to said flow of current for generating a voltage;
   - and means coupling said voltage across said device to produce conduction through said device.

2. The invention as defined in claim 1 wherein one of said impedances is a diode, the impedance of which decreases as a direct function of applied current, and the second impedance is a thermistor, the impedance of which increases with applied current.

3. In a signal sensitive modulator system, the combination comprising:

a high power current-flow control device;

a direct current source of energy;

a source of intelligence signals;

means responsive to said intelligence signals for gating the energy from said direct current source through said device for periods when said signals exceed a predetermined level, said means including a plurality of parallel-connected transistors each having a base electrode, an emitter electrode, and a collector electrode, said collector electrodes being reversed biased and said emitter electrodes being forward biased from said direct current source;

a source of base-biasing potential for back-biasing said transistors beyond cut-off;

means coupling said intelligence signals to said bases, whereby said back bias on said bases is opposed and current flows through said emitter and collector junction when said back bias is overcome;

means responsive to said flow of current for generating a voltage;

means coupling said voltage across said device to produce conduction through said device;

a transistor amplifier having a base, an emitter, and a collector;

a semiconductor diode rectifier connected to said base of said amplifier;

means coupling said source of intelligence signals across said base and emitter through said semiconductor diode rectifier;

means, in the absence of intelligence signals, for back-biasing said transistor amplifier beyond cut-off;

means coupling the output from across said collector and emitter to the bases of said plurality of transistors;

and a second semiconductor diode connected between said base and said emitter of said transistor amplifier for preventing degenerative feedback in said amplifier when said output is coupled to said bases.

4. In a signal sensitive modulator system, the combination comprising:

a high power vacuum tube having a plate, a cathode, and a control grid;

an alternating current load;

a transformer having primary and secondary windings, said secondary winding being connected in series with said alternating current load, said plate, and said cathode;

a source of carrier frequency connected between said grid and said cathode;

a source of intelligence signals;

a source of direct current;

a plurality of low power parallel-connected current-flow control devices connected in series with said source of direct current and said primary winding, said parallel-connected current-flow control devices comprising transistors each having a base, an emitter, and a collector, the collector and emitter of each of said transistors being connected in series with said primary winding across said source, said intelligence signals being applied across said emitter and said base for rendering said devices conductive; and means, in the absence of intelligence signals, for back-biasing said devices beyond cut-off.

5. The invention as defined in claim 4 wherein said means for back-biasing said transistors includes a second source of direct voltages;

first and second impedances connected across said second source, at least one of said impedances having impedance characteristics which vary with applied currents;

and a connection from each of said bases of said transistors to the junction of said impedances.

6. The invention as defined in claim 5 wherein said first impedance is a semiconductor diode, the impedance of which decreases with applied current, and the second impedance is a thermistor, the impedance of which increases with applied current.

7. In a signal sensitive modulator system, the combination comprising:

a high power current-flow control device having a collecting electrode, an emitting electrode, and a control electrode;

a source of carrier frequency energy coupled across said control and emitting electrodes;

a direct current source of energy;

a source of intelligence signals;

means responsive to said intelligence signals for gating the energy from said direct current source across said collecting and emitting electrodes for the periods when said intelligence signals exceed a predetermined level, whereby amplified modulated carrier frequencies are developed across said collecting and emitting electrodes, said means including a plurality of parallel-connected transistors each having a base electrode, an emitter electrode, and a collector electrode;

a load, said emitter and collector electrodes of said plurality of transistors each being connected in series with said load across said direct current source;

a source of base-biasing potential;

first and second impedance elements connected in series across said source of base-biasing potential, at least one of said impedances having impedance characteristics which vary with applied current;

a connection from said bases to the junction of said impedances to back bias said transistors beyond cut-off;

means coupling said intelligence signals to said bases, whereby said back bias on said bases is overcome and current flows through said load, and whereby rectified current-flow through the base-emitter junctions of said plurality of transistors through said impedances opposes said back bias to regenerate the gain of said transistor;

and means coupling the voltage across said load to said device to produce conduction through said collecting and emitting electrodes.

8. The invention as defined in claim 7 wherein said current-flow control device comprises a vacuum tube.

9. The invention as defined in claim 7 wherein said first impedance is a diode, the impedance of which decreases as a direct function of applied currents, and said second impedance is a thermistor, the impedance of which varies as a direct function of applied current.

10. The invention as defined in claim 7 wherein said intelligence signals are of short durations.

11. In a signal sensitive modulator system, the combination comprising:

a transistor having base, emitter, and collector electrodes;

a source of direct current;

a load connected to said emitter electrode, said source of direct current being connected in series with said load and said emitter and collector electrodes;

a first semiconductor diode connected to said base electrode;

a source of input signals connected across said base and collector electrodes through said first semiconductor diode;

means for back-biasing said base electrode with respect to said emitter electrode beyond transistor cut-off in the absence of input signal from said source of input signal;

and means for reducing degenerative feedback including a second semiconductor diode connected between said emitter and said base electrodes, said semiconductor diode being poled to permit the flow of rectified base-emitter current.

References Cited in the file of this patent

UNITED STATES PATENTS

| | | |
|---|---|---|
| 2,644,893 | Gehman | July 7, 1953 |
| 2,844,712 | Noizeux | July 22, 1958 |
| 2,882,353 | Freedman | Apr. 14, 1959 |
| 2,941,154 | Rogers | June 14, 1960 |
| 3.056,891 | Kabell | Oct. 2, 1962 |